US012764460B2

(12) United States Patent
Berrada et al.

(10) Patent No.: US 12,764,460 B2
(45) Date of Patent: Oct. 13, 2026

(54) ORIENTING A BEAMFORMING BEAM TOWARD A MEDIA DEVICE

(71) Applicant: The Nielsen Company (US), LLC, New York, NY (US)

(72) Inventors: Meryem Berrada, Tampa, FL (US); Justin Dan Mathew, Fort Lauderdale, FL (US)

(73) Assignee: The Nielsen Company (US), LLC, New York, NY (US)

( * ) Notice: Subject to any disclaimer, the term of this patent is extended or adjusted under 35 U.S.C. 154(b) by 125 days.

(21) Appl. No.: 18/956,835

(22) Filed: Nov. 22, 2024

(65) Prior Publication Data

US 2025/0203280 A1 Jun. 19, 2025

Related U.S. Application Data

(60) Provisional application No. 63/609,395, filed on Dec. 13, 2023.

(51) Int. Cl.
*H04R 1/40* (2006.01)
*H04R 3/00* (2006.01)

(52) U.S. Cl.
CPC ............ *H04R 1/406* (2013.01); *H04R 3/005* (2013.01); *H04R 2203/12* (2013.01)

(58) Field of Classification Search
CPC ..... H04R 1/406; H04R 3/005; H04R 2203/12
See application file for complete search history.

(56) References Cited

U.S. PATENT DOCUMENTS 10,229,667 B2 * 3/2019 Marquez .............. G10K 11/178
10,269,343 B2 * 4/2019 Wingate .................. G10L 15/22
11,527,232 B2 * 12/2022 Dusan .............. G10K 11/17857
2006/0104458 A1 * 5/2006 Kenoyer ................ H04R 3/005 381/92

* cited by examiner

*Primary Examiner* — Paul W Huber

(57) ABSTRACT

In one example, a method is described. The method includes receiving, via a receiver in a meter, a wireless data packet. The wireless data packet is associated with a media device ON signal of a media device. The method further includes orienting, based on receipt of the wireless data packet, a beamforming beam of the meter toward the media device.

20 Claims, 7 Drawing Sheets

ORIENTING A BEAMFORMING BEAM TOWARD A MEDIA DEVICE

CROSS-REFERENCE TO RELATED APPLICATION(S)

This disclosure claims priority to U.S. Provisional Pat. App. No. 63/609,395, filed Dec. 13, 2023, which is hereby incorporated herein by reference in its entirety.

BACKGROUND

The present disclosure relates in general to beamforming, and in particular, to orienting a beamforming beam toward a media device.

USAGE AND TERMINOLOGY

In this disclosure, unless otherwise specified and/or unless the particular context clearly dictates otherwise, the terms “a” or “an” mean at least one, and the term “the” means the at least one.

SUMMARY

In one aspect a method is described. The method includes receiving, via a receiver in a meter, a wireless data packet, the wireless data packet is associated with a media device ON signal of a media device; and orienting, based on receipt of the wireless data packet, a beamforming beam of the meter toward the media device. In some aspects, the orienting the beamforming beam toward the media device includes receiving, using a microphone array of the meter, an audio signal; determining a direction of arrival of the audio signal; and beamforming based on the direction of arrival. The direction of arrival corresponds to a location of a source of the audio signal, and the source of the audio signal is the media device. In one or more aspects, the method includes calculating, using the receiver, a direction corresponding to a location where the wireless data packet was transmitted from; and estimating, using the calculated direction, a direction of arrival; and orienting the beamforming beam toward the media device includes using the estimated direction of arrival to orient the beamforming beam toward the media device. In at least one aspect, the media device ON signal is generated when the media device powers ON. The method includes, in some aspects, receiving, via a dongle coupled to the media device, a media device ON signal; and transmitting, using a transmitter in the dongle, the wireless data packet over a network. In one or more aspects, the method includes receiving, after orienting, audio signals from the media device for media identification, where a microphone array of the meter receives the audio signals. In some aspects, the method includes identifying media content from the received audio signals.

In another aspect, a non-transitory computer-readable storage medium, having stored thereon program instructions that, upon execution by a processor, cause performance of operations is described. The operations include receiving, via a receiver in a meter, a wireless data packet, the wireless data packet is associated with a media device ON signal of a media device; and orienting, based on receipt of the wireless data packet, a beamforming beam of the meter toward the media device. In some aspects, the orienting the beamforming beam toward the media device includes receiving, using a microphone array of the meter, an audio signal; determining a direction of arrival of the audio signal; and beamforming based on the direction of arrival. The direction of arrival corresponds to a location of a source of the audio signal, and the source of the audio signal is the media device. In one or more aspects, the operations further include calculating, using the receiver, a direction corresponding to a location where the wireless data packet was transmitted from; and estimating, using the calculated direction, a direction of arrival; and orienting the beamforming beam toward the media device includes using the estimated direction of arrival to orient the beamforming beam toward the media device. In some aspects, the operations include: receiving, after orienting, audio signals from the media device for media identification, where a microphone array of the meter receives the audio signals; and identifying media content from the received audio signals. In at least one aspect, the media device ON signal is generated when the media device powers ON. The operations include, in some aspects, receiving, via a dongle coupled to the media device, a media device ON signal; and transmitting, using a transmitter in the dongle, the wireless data packet over a network.

In another aspect, a computing system is described. The computing system includes a processor and a non-transitory computer-readable storage medium, having stored thereon program instructions that, upon execution by the processor, cause performance of operations. The operations include receiving, via a receiver in a meter, a wireless data packet, the wireless data packet is associated with a media device ON signal of a media device; and orienting, based on receipt of the wireless data packet, a beamforming beam of the meter toward the media device. In some aspects, the orienting the beamforming beam toward the media device includes receiving, using a microphone array of the meter, an audio signal; determining a direction of arrival of the audio signal; and beamforming based on the direction of arrival. The direction of arrival corresponds to a location of a source of the audio signal, and the source of the audio signal is the media device. In one or more aspects, the operations include calculating, using the receiver, a direction corresponding to a location where the wireless data packet was transmitted from; and estimating, using the calculated direction, a direction of arrival; and orienting the beamforming beam toward the media device includes using the estimated direction of arrival to orient the beamforming beam toward the media device. In at least one aspect, the media device ON signal is generated when the media device powers ON. The operations include, in some aspects, receiving, via a dongle coupled to the media device, a media device ON signal; and transmitting, using a transmitter in the dongle, the wireless data packet over a network. In one or more aspects, the operations include receiving, after orienting, audio signals from the media device for media identification, where a microphone array of the meter receives the audio signals. In some aspects, the method includes identifying media content from the received audio signals.

DETAILED DESCRIPTION

I. Overview

Figure 1:
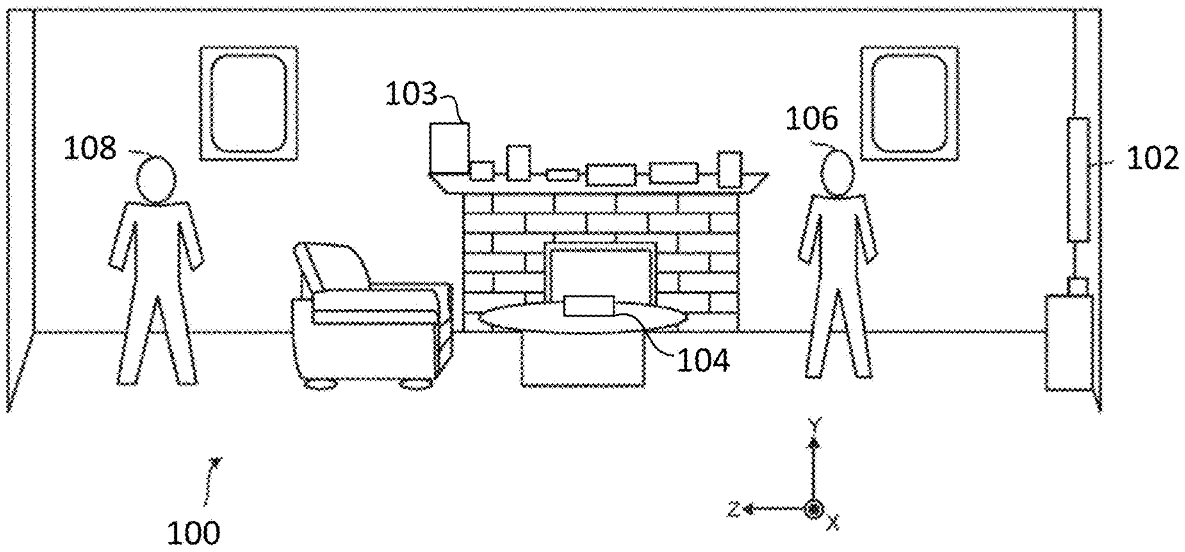
FIG. 1 is a diagrammatic illustration of an example media exposure environment including an example audience measurement device disclosed herein in accordance with one or more aspects.

Media providers and/or other entities such as, for example, advertising companies and broadcast networks, are often interested in the viewing, listening, and/or media behavior of audience members and/or the public in general. To monitor these behaviors, an audience measurement entity ("AME") may enlist panelists (e.g., persons agreeing to be monitored) to cooperate in an audience measurement panel. The media usage and/or exposure habits of these panelists, as well as, demographic data about the panelists is collected and used to statistically determine the size and demographics of a larger audience of interest. One way to monitor these behaviors is using an audience measurement device such a meter within the home of the panelist. When a panelist enlists, the AME will send a technician to the panelists home to set up the meter to detect audio signals from a media device such as from a loudspeaker of a television, or alternatively, send the meter in the mail to the panelist for self-installation.

However, the panelist's home may present challenges to the meters that monitor media devices. A meter that is located in one of the media exposure environments may be configured to (1) detect any audio signals, (2) then detect if media content is present in the audio signals, and (3) then to credit the media as having been presented. In order to generate reliable ratings, it is useful for meters to be able to distinguish sounds in the media exposure environment that are related to media content from the sounds in the media exposure environment that are not. Therefore, the ability of the meter to receive a strong and accurate signal from a media device is beneficial to produce accurate media ratings. Examples provided herein describe methods and systems for increasing the accuracy of media ratings by improving techniques for orienting a beamforming beam toward a media device to capture better media data within the media exposure environment.

Moreover, since the meter may be positioned in numerous locations and/or moved within the media exposure environment, it may be desirable for the meter to be able to detect a media sound from the media device from a variety of locations. Additionally, the media device may be moved within the media exposure environment, or the location from which the audio originates may change if a user selects a different sound output. For example, in some instances, the user may select an internal loudspeaker of the media device as a source of the audio, and in other instances, the user may select one or more external loudspeakers, which are operably associated with the media device and are located around the media exposure environment, as the source of the audio. Examples provided herein describe methods and systems for increasing the accuracy of media ratings by improving techniques for orienting a beamforming beam toward a media device to capture better media data when the location of the media device, the location of the meter, and/or the number of media devices.

In particular, examples provided herein describe systems and methods for using a media device ON signal, a media device ON sound, and/or a start ON sound of an application on a media device.

FIG. 1 is an illustration of an example media exposure environment 100 that includes a media device 102 operably coupled to a loudspeaker 103 and a meter 104 for collecting audience measurement data. The media exposure environment 100 further includes a first person 106 located near the media device 102, and a second person 108 located further from the media device 102 within the media exposure environment 100 in comparison to the first person 106. In the illustrated example of FIG. 1, the media exposure environment 100 is a room of a household (e.g., a room in a home of a panelist of an AME) that has been statistically selected to develop media ratings data for population(s)/demographic(s) of interest. In the illustrated example, the media device 102 is a television, and the meter 104 is located at a position away from the media device 102. In the illustrated example, one or more persons (such as the first person 106) of the household have registered with an audience measurement entity (e.g., by agreeing to be a panelist) and have provided demographic information to the audience measurement entity to allow for associating demographics with viewing activities (e.g., media exposure).

In one or more aspects, the media exposure environment 100 is a different room in the household than that illustrated by FIG. 1 such as a kitchen or bedroom. In some aspects, the media exposure environment 100 is a vehicle such as a car. In several aspects, the media exposure environment 100 includes a plurality of rooms within a household or business, so long as audio sounds from a room of the plurality of rooms is being reliably detected by the meter 104. In some aspects, the media exposure environment 100 may be in a room of a non-statistically selected home, a theater, a tavern, a retail location, an arena, or the like.

In several aspects, the media device 102 is a device other than a television such as another information presentation device. An information presentation may include a radio, a video game console, a tablet, a laptop, a cellular telephone, a computer, and the like. In some aspects, the media device 102 includes a television and one or more loudspeakers such as the loudspeaker 103 operably associated with the television. In various aspects, the media device 102 may be configured to switch from a variety of sound outputs such as from an internal loudspeaker to an external loudspeaker disposed on a table or a fireplace mantle within the media exposure environment. In one or more aspects, the media device 102 includes the loudspeaker 103.

In several aspects, the loudspeaker 103 is an internal loudspeaker of the media device 102. In one or more aspects, the loudspeaker 103 is a plurality of loudspeakers. In several aspects, the loudspeaker 103 is one or more external loudspeakers, such as an external surround-sound speakers. In one or more aspects, the loudspeaker 103 is positioned away from the media device 102 in the media exposure environment 100 such as on the fireplace mantle, as shown in FIG. 1, or on the table. In other aspects, the loudspeaker 103 is directly coupled to the media device via a wired connection.

In at least one aspect, the meter 104 is an audience measurement device provided to the first person 106 and/or second person 108 for collecting and/or analyzing the data from the media device 102. The meter 104, in some aspects, is coupled directly to the media device 102. For example, the meter 104 may be positioned beneath the television and connected to the television via a universal serial bus ("USB"), a High-Definition Multimedia Interface ("HDMI") cable, or the like. In other aspects, the meter 104 is wirelessly coupled to the media device 102 via a device such as a USB dongle. In some aspects, the meter 104 is moveable around the media exposure environment 100 and/or may be positioned in a number of locations around the media exposure environment 100 to detect audio signals associated with media presented by the media device 102.

In one or more aspects, the first person 106 is a panelist. In other aspects, the first person 106 is not associated with the panel and is a guest to the media exposure environment 100. In some aspects, the first person 106 is omitted from the media exposure environment 100. In one or more aspects, the second person 108 is a panelist. In some aspects, the second person 108 is omitted from the media exposure environment 100. In other aspects, the second person 108 is not associated with the panel and is a guest of the first person 106 to the media exposure environment 100. In other aspects, additional persons are located within the media exposure environment 100.

In one or more aspects, a person such as the second person 108 switches sound output from the media device 102 such as from the television to one or more external loudspeakers, and the meter 104 is configured to determine if the audio signals from the one or more external loudspeakers are media sounds. In some aspects, the meter 104 and/or the media device 102 is moved within the media exposure environment 100. In one or more aspects, the meter 104 determines the location of audio signals containing media sounds after the meter 104 is moved, after the media device 102 is repositioned, when the media device 102 switches sound outputs, and/or the like.

II. System Architecture

Figure 2:
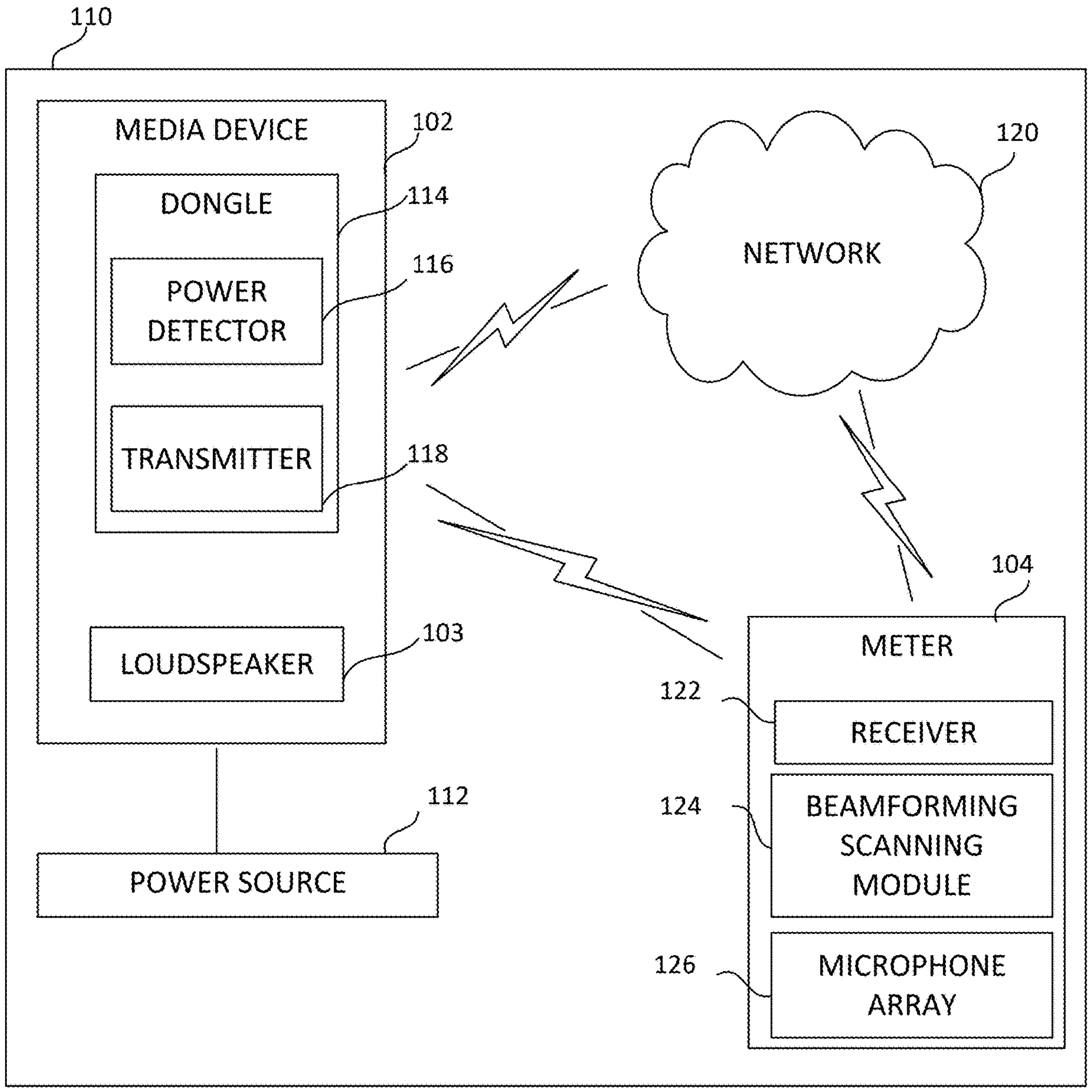
FIG. 2 is a simplified block diagram of an example system in accordance with one or more aspects.

Referring to FIG. 2, an example system is generally referred to by reference numeral 110. The system 110 includes the media device 102, the loudspeaker 103, and the meter 104. The media device 102 is coupled to the power source 112. The media device 102 may include a dongle 114 coupled to the media device 102. The dongle 114 includes a power detector 116 for detecting power received by the media device 102 from the power source 112 and a transmitter 118 for transmitting data packets to the meter 104, e.g., via a network 120. The meter 104 includes a receiver 122 for receiving the transmitted data packets, a beamforming scanning module 124, and a microphone array 126.

In various aspects, at least a portion of the system 110 is a computing system as described herein. In some aspects, the system 110 is located within the media exposure environment 100. In other aspects, only a portion of the system 110 is located within the media exposure environment 100. For example, in some aspects, the system 110 includes a server (not located within the media exposure environment 100), and the meter 104 is in communication with the server.

In some aspects, a plurality of media devices 102 are present within the system 110. In one or more aspects, the plurality of media devices 102 include two different types of media devices such as a radio and a television. In one or more aspects, the media device 102 is a television with a plurality of ports such as, but not limited to one or more of: a USB port, a HDMI port, a local area network ("LAN") port, an optical cable port, and the like. In some aspects, the media device is operably coupled to the loudspeaker 103. In one or more aspects, the loudspeaker 103 is an internal speaker of the media device 102. In other aspects, the loudspeaker 103 is an external speaker, wirelessly connected or wired, to the media device 102.

In some aspects, the meter 104 is stationary within the media exposure environment 100 when the meter is collecting media data. However, the meter 104 may be moved to various locations within the media exposure environment 100, in some instances. In other aspects, the meter 104 is portable such as a portable people meter (PPMS). In some aspects, the meter 104 is coupled directly to the media device 102 via a wired connection such as using an HDMI cable. In some aspects, the meter 104 is disposed between the power source 112 and the media device 102. For example, the power source 112 may be directly coupled to the meter 104, and the meter 104 may be directly coupled to the media device 102 such that the powering on the media device 102 causes the powering on of the meter 104.

In one or more aspects, the power source 112 is included in the system 110 to provide power to the media device 102. In one or more aspects, the power source 112 is an alternating current ("A/C") power source or a battery. In some aspects, the power source 112 provides power to the meter 104. In some aspects, the power source 112 provides power to the meter 104 prior to providing power to the media device 102. In other aspects, the meter 104 has a separate power source such as an internal battery.

In various aspects, the dongle 114 may be coupled directly to the media device 102. In some instances, the dongle 114 may be inserted into a port of the media device 102. For example, the dongle 114 may be a USB dongle and is insertable into the USB port of the media device. The dongle 114 may be configured to wireless communicate with the meter 104 in accordance with a wireless communication protocol. For example, the dongle 114 may be configured to wirelessly communicate with the meter 104 via Bluetooth® and/or via Wi-Fi.

In some aspects, the power detector 116 is a software module on the dongle 114 that causes the transmitter 118 to transmit its signal. The software module on the dongle 114 may keep track of when the media device 102 was powered on and when the media device 102 was powered off. When the media device 102 is powered on, the media device 102 supplies power to the USB port or an HDMI port, which provides power to the dongle 114, and subsequently, the power detector 116 causes the transmission, by the transmitter 118, of the signal associated with the media device ON signal. Alternatively, the power detector 116 is a hardware component integrated within the dongle 114. In some instances, the power detector 116 is a power sensor, a voltage sensor, a current sensor, or the like. In some aspects, the power detector 116 includes a configurable threshold setting for determining when the media device 102 is considered "on" versus when the media device 102 is determined to be "off." In some aspects, the threshold setting is a predetermined setting. In one or more aspects, the power detector 116 is a combination of hardware and software.

In some aspects, the power detector 116 causes the transmitter 118 to transmit a wireless data packet. In various aspects, the transmitter 118 includes the power detector 116. For example, when the transmitter 118 is powered on by the power source 112 providing power to the media device 102 and therefore to the dongle 114, power is thus detected and the transmission may be sent. In various aspects, the transmitter 118 is in direct communication with and/or operably coupled to the power detector 116. In some aspects, the power detector 116 causes the transmitter 118 to transmit a data packet based on satisfying the threshold setting. The transmitter 118 may be a Wi-Fi transmitter, a Bluetooth® transmitter, a BLE transmitter, or a similar wireless transmitter.

In some aspects, the network 120 may be a Wi-Fi network or similar wireless network. In several aspects, the network 120 couples the meter 104 to the media device 102. In some instances, the network 120 is a wired network that directly couples the meter 104 to the media device 102. In other aspects, the meter 104 and the media device 102 communicate directly without the use of the network 120 (e.g., Bluetooth® or Wi-Fi direct), and the network 120 may be omitted.

In several aspects, the receiver 122 is in direct communication with the transmitter 118 (e.g., Bluetooth®). The receiver 122 may be a Wi-Fi receiver, a Bluetooth® receiver, a Bluetooth® Low Energy ("BLE") receiver, or a similar wireless receiver. In some aspects, the receiver 122 receives the data packet from the transmitter 118. In various aspects, the receiver 122 is in communication with and/or operably coupled to the beamforming scanning module 124. In various aspects, the receipt of the data packet causes the meter 104 to begin scanning using the beamforming scanning module 124. In some aspects, the receiver 122 is a receiver antenna array such as, but not limited to, a Bluetooth® antenna array or a Wi-Fi antenna array. In one or more aspects, the receiver 122 is configured to identify the direction of arrival ("DOA") by calculating a direction associated with the transmission and receipt of the data packet and using DOA estimation techniques on the calculated direction to determine an estimated DOA that may be used for beamforming.

In some aspects, the beamforming scanning module 124 may be hardware or software that directs how the microphone array 126 receives audio signals. In various aspects, the beamforming scanning module 124 determines a desired orientation associated with the location of the media device 102 and configures the microphone array 126 and/or the received audio signals from the microphone array 126 based on the desired orientation. In one or more aspects, the desired orientation is based on the direction of arrival ("DOA") of sound emitted by the loudspeaker 103 as a result of media content being presented by the media device 102. In several aspects, each microphone of the microphone array 126 are spatially separated with a known array geometry, and therefore, the audio signals are received at varying times (e.g., the audio signals arrive at the microphones with a time delay when spatially distant). Therefore, the DOA may be calculated using a correlation on this phase information, statistical analyses on different audio beamformed directions, or analyses on the transmitted signal from the dongle 114 and the receiver 122. The DOA indicates a location of the source of the sound associated with media being presented in association with the media device 102. The beamforming scanning module 124 may beamform later received audio signals based on the determined DOA. In some instances, the beamforming scanning module 124 determines the DOA and controls the microphone array 126 to capture signals only from the DOA. In one or more instances, the beamforming scanning module 124 receives an estimated DOA from the receiver 122. In one or more instances, the beamforming scanning module 124 locates the source of the sound by sampling on all microphones of the microphone array 126, calculating a signal to noise ratio for each microphone, determining the microphone or set of microphones of the microphone array 126 with the largest signal to noise ratio, and set that direction as the DOA of the source of the sound associated with the media device 102. In some instances, the location of the source of the sound associated with the media presented on the media device 102 is determined using delay-and-sum beamforming. For example, time differences between a sound event and each microphone of the microphone array 126 is calculated and the direction and strength of the sound is determined in order to locate the source.

In some aspects, the beamforming scanning module 124 is configured to orient the beamforming beam's DOA toward the source of a new sound associated with the media presented by the media device 102. In one or more aspects, the beamforming scanning module 124 orient the beamforming beam's DOA toward the source of the new sound, using the previously determined DOA.

In one or more aspects, the microphone array 126 may be in a variety of shapes and/or configurations. For example, the microphone array 126 may be a rectangular shape, a triangular shape, a square shape, or a circular shape. The microphone array 126 may include a plurality of microphones, which may be in a variety of configurations. The number of microphones of the microphone array 126 may vary. In some instances, the microphone array 126 includes at least two microphones. In several instances, the microphone array 126 may be a two-dimensional array. In other instances, the microphone array 126 may be a three-dimensional array. The microphone array 126, in some aspects, is a set of digital microphones. In other aspects, the microphone array 126, are a set of analog microphones.

Figure 3:
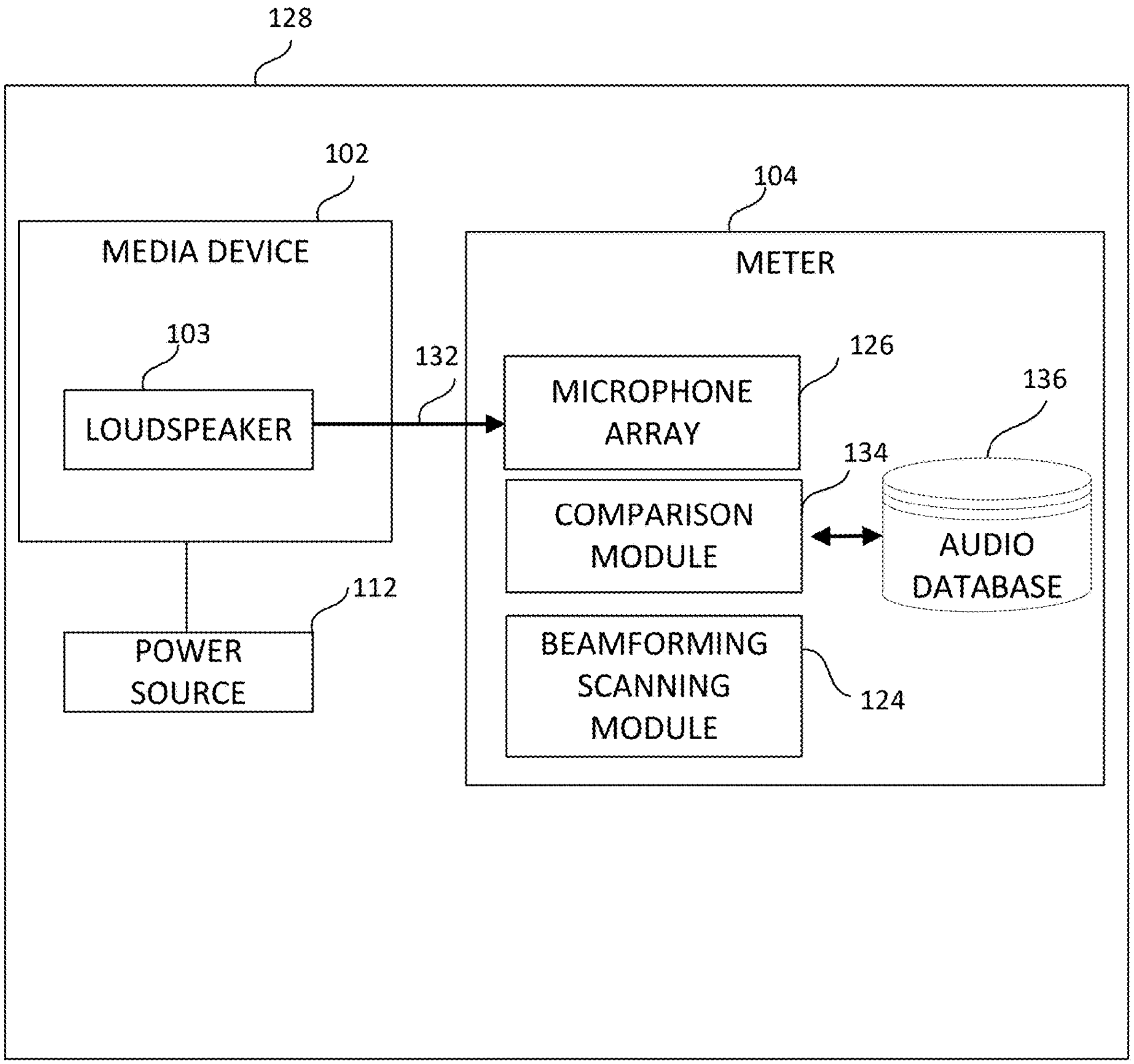
FIG. 3 is another simplified block diagram of an example system in accordance with one or more aspects.

Referring now to FIG. 3, another example system is generally referred to by reference numeral 128. The system 128 includes the media device 102 and the meter 104. The media device 102 is coupled to the power source 112. The media device 102 may include a loudspeaker 103 coupled to the media device 102. The loudspeaker 103 may produce an audio signal 132 (represented by an arrow), which is detected by the microphone array 126. The microphone array 126 may be a component of the meter 104. The meter 104 includes the beamforming scanning module 124, the comparison module 134, and the audio database 136. The comparison module 134 is in direct communication with the audio database 136. The audio database 136 may store one or more audio signals as a reference database for media device ON sounds. Examples of what ON sounds are include a media device-specific startup sound, tone, beeps, or a sequence of tones produced by media devices (such as the media device 102) when powered on. The comparison module 134 is configured to compare the audio signal 132 from the loudspeaker 103 to audio signals in the audio database 136 to determine a match for media device ON sounds. The beamforming scanning module 124 is in communication with the comparison module 134 such that when the comparison module 134 determines a match, the beamforming scanning module 124 initiates beamforming.

In some instances, at least a portion of the system 128 is a computing system as described herein. In some aspects, the system 128 is located within the media exposure environment 100. In other aspects, only a portion of the system 128 is located within the media exposure environment 100. For example, in some aspects, the system 128 includes a server (not located within the media exposure environment 100), where the meter 104 is in communication with the server. In some instances, the audio database 136 of the system 128 is located outside the media exposure environment 100 and is accessible via the server. In some aspects, the system 128 includes one or more of the same components as the system 110 such as the beamforming scanning module 124.

In various aspects, the media device 102 and/or the meter 104 includes additional components as described herein. In some aspects, the media device 102 may include a setting for changing sound output. For example, the media device 102 may switch from using the loudspeaker 103 that is an internal loudspeaker to the loudspeaker 103 that is an external loudspeaker.

In one or more aspects, the loudspeaker 103 is a plurality of loudspeakers. In some aspects, the loudspeaker 103 is integrated into the media device 102 such as a television speaker or a radio speaker. In several aspects, the loudspeaker 103 is coupled to the media device 102. In one or more aspects, the loudspeaker 103 is wirelessly coupled to the media device 102. In some aspects, the loudspeaker 103 is a set of external surround sound loudspeakers distributed around the media exposure environment 100. In one or more aspects, the location of the loudspeaker 103 relative to the media device 102 and/or the meter 104 within the media exposure environment 100 may change. For example, a panelist such as the first person 106 may switch the sound output from the loudspeaker 103 that is an internal loudspeaker to the loudspeaker 103 that is an external loudspeaker.

In some instances, the audio signal 132 is a single audio signal received by the microphone array 126. In other examples, the audio signal 132 is a plurality of audio signals. In some aspects, the audio signal 132 has a duration of a few seconds (e.g., two seconds, four seconds, or six seconds).

In one or more aspects, the microphone array 126 is configured to receive the audio signal 132 from the loudspeaker 103. In some aspects, the microphone array 126 is in communication with the comparison module 134 and sends the audio signal 132 to the comparison module 134 for comparison.

In some aspects, the comparison module 134 includes a data buffer or data storage to store the audio signal 132. In one or more aspects, the comparison module 134 compares the audio signal 132 with the reference audio signals from the audio database 136 within the meter 104. In one or more aspects, the comparison module 134 is configured to compare the audio signal 132 to a reference audio signal from the audio database 136 using a direct signal to signal comparison, signature comparison, based on a decoded watermark comparison, or the like.

In various aspects, the audio database 136 includes a plurality of reference audio signals. In one or more aspects, the reference audio signals stored in the audio database 136 also include only one or more audio signals that correspond to an "ON" sound of an application playing and/or initiated on the media device. For example, the media device 102 may be a television, and the television may have an application specific startup sound, chime, tone, beep, or sequence of tones. In some aspects, the audio database 136 stores reference audio signals that correspond to the "ON" sounds of a plurality of media devices and to a plurality of "ON" sounds of applications opened and/or played. In some aspects, the audio database 136 is stored on the meter 104. In other aspects, the audio database 136 is accessible by the comparison module 134 of the meter 104, but the audio database 136 is stored on a server outside the media exposure environment 100.

III. Example Operations

The system 110 and/or the system 128 and/or components thereof can be configured to perform and/or can perform one or more operations. Examples of these operations and related features will now be described.

Figure 4:
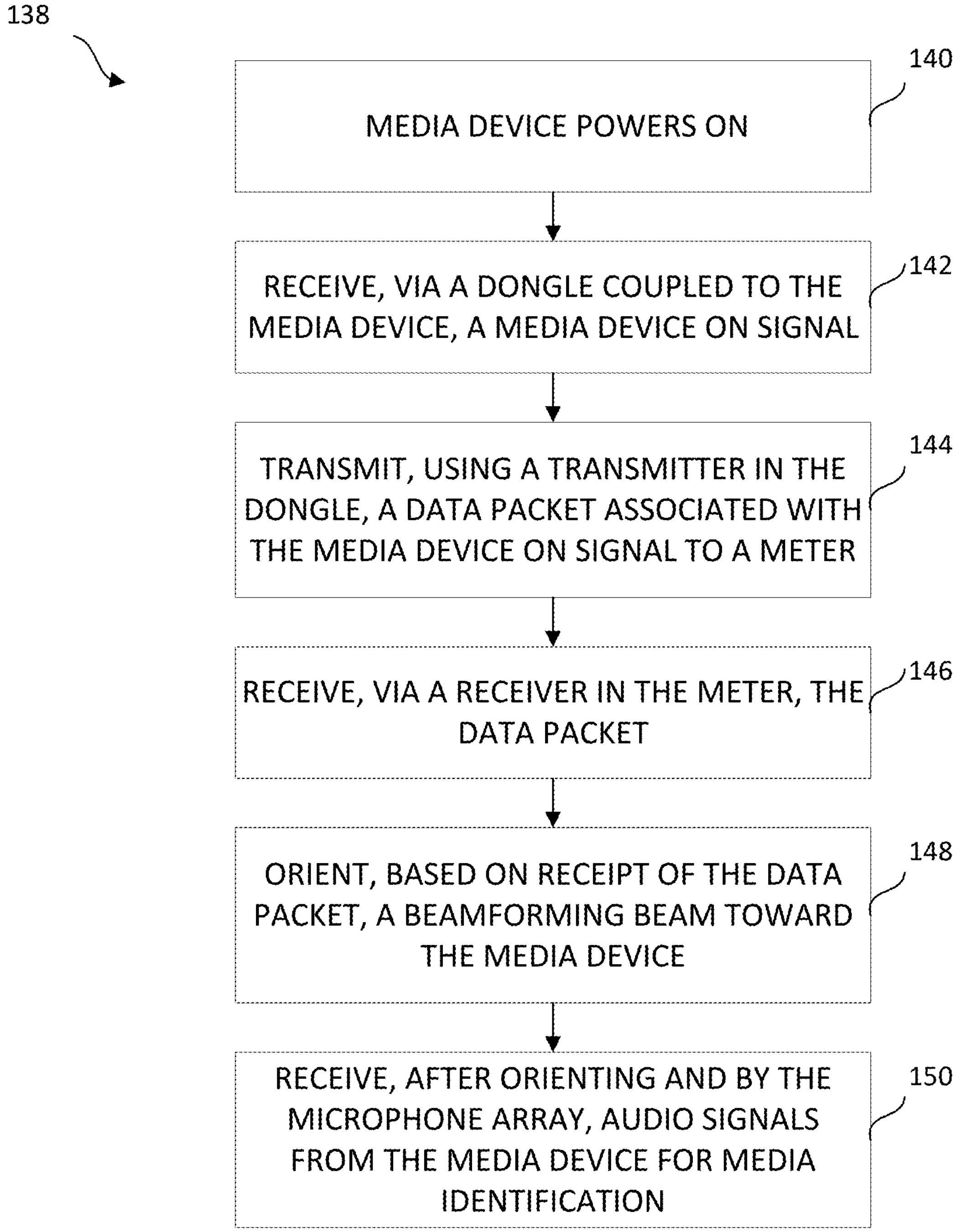
FIG. 4 is a flow chart of an example method for using a media device ON signal of a media device to orient a beamforming beam toward the media device in accordance with one or more aspects.

Referring to FIG. 4, with continuing reference to FIGS. 1-2, a method 138 for orienting a beamforming beam toward the media device 102 according to one or more instances is described. Method 138 is illustrated as a set of operations or blocks 140 through 150. Not all of the illustrated blocks 140 through 150 may be performed in all aspects of method 138. One or more blocks that are not expressly illustrated in FIG. 4 may be included before, after, in between, or as part of the blocks 140 through 150. In some aspects, one or more of the blocks 140 through 150 may be implemented, at least in part, by the system 110, in the form of executable code stored on non-transitory, tangible, machine-readable media that when run by one or more processors may cause the one or more processors to perform one or more of the processes. In one or more aspects, the blocks in method 138 are performed within a computing system, within the system 110 in FIG. 2, as described herein.

In an example aspect, the method 138 includes: a media device powering on at a block 140; receiving, via a dongle coupled to the media device, a media device ON signal at a block 142; transmitting, using a transmitter in the dongle, a data packet associated with the media device ON signal to a meter at a block 144; receiving, via a receiver in the meter, the data packet at a block 146; orienting, based on receipt of the data packet, a beamforming beam toward the media device at a block 148; and receiving, after orienting and by the microphone array, audio signals from the media device for media identification at a block 150.

In various aspects, the block 140 includes sending power to the media device using a power source such as the power source 112. In several aspects, the block 140 includes producing a TV ON signal in response to receiving power at the media device. In some aspects, the media device is the media device 102. In one or more aspects, a panelist such as the first person 106 turns on the media device 102 such that the media device 102 receives power.

In some aspects, the block 142 occurs automatically in response to the block 140. In several aspects, the dongle is the dongle 114 and is plugged directly into a port of the media device 102. In several aspects, the block 142 includes receiving a media device ON signal and determining if the media device ON signal that has satisfied a stored or predetermined threshold value (for example, a stored signal strength or a wattage value). In some aspects, the dongle 114 includes a power detector 116 that is used to determine if the media device ON signal has satisfied the threshold value. In some aspects, at the block 142, the power detector 116 is used for determining if the media device 102 has power and/or is turned on. In some aspects, the media device ON signal is a TV ON signal.

In one or more aspects, the block 144 occurs after the block 142. In some aspects, the block 144 includes transmitting the data packet only if the power detector 116 detects enough power to satisfy the stored threshold value. In some aspects, the block 144 transmits over a network such as the network 120. In other aspects, the media device 102 is directly coupled to the meter 104. In some aspects, the data packet in block 144 is a Wi-Fi packet, a Bluetooth® data packet, a BLE data packet, or the like. In various aspects, the data packet in the block 144 indicates that the media device

102 is turned on and has power. In some aspects, the transmitter is the transmitter 118 of the dongle 114.

In several aspects, the block 146 occurs after the block 144. In some aspects, the receiver is the receiver 122 of the meter 104. In some aspects, the block 146 receives the data packet over the network 120. In one or more aspects, receiving the data packet associated with the media device ON signal alerts the meter 104 that the media device 102 may begin to produce audio signals associated with media content. In one or more aspects, the receiver-type (such as Bluetooth®) of the receiver 122 corresponds to the transmitter-type of the transmitter 118 (such as Bluetooth®).

In one or more aspects, an additional block is added to the method 138 in between the block 146 and the block 148. In some aspects, the additional block includes receiving by the microphone array, audio signals from the media device. In several aspects, the additional block occurs simultaneously with the block 148 or is incorporated into the block 148. In some instances, the additional block finds a new source of sound at the same time as the block 148 orients the beam DOA toward the source of the new sound. In some aspects, the new source of sound is set as sound from the media device 102 based on the recently received media device ON signal at the meter. In one or more aspects, the new source of sound may be dynamic as the sound outputs of the media device 102 may change, the location of the meter may be moved, which media device 102 is being used, and the like.

In some aspects, the block 148 occurs in response to receiving the data packet by the receiver 122. In some aspects, the data packet is a media device ON message that triggers the beamforming scanning module 124. The beamforming scanning module 124 may be implemented to orient the beamforming beam toward sound associated with media content from the media device 102. In some aspects, the data packet received by the receiver 122, at the block 146, includes DOA information. The DOA information may include information associated with where the media device ON message was sent from. In some aspects, the DOA and/or DOA information may be sent from the receiver 122 to the beamforming scanning module 124, so that the beamforming scanning module may use the DOA and/or the DOA information for beamforming at the block 148. In some instances, the receiver 122, which may be a Bluetooth® or Wi-Fi antenna array, calculates a direction for which the media device ON message is coming from (such as the direction of the transmitter 118 or a direction corresponding to a location where the data packet was transmitted from). Then the DOA is estimated based on the calculated direction. The DOA may be estimated using a variety of DOA estimation techniques, such as, but not limited to, minimum variance distortionless response ("MVDR") or multiple signal classification ("MUSIC") techniques that focus DOA estimation on specific frequencies that the message is being transmitted on. For example, MUSIC is a subspace-based direction-finding algorithm that can be used to estimate the DOA based on the direction computed from the receiver 122. In some aspects, a plurality of DOA estimation techniques is used to estimate the DOA. The estimated DOA may then be sent to the beamforming scanning module 124 for use at the block 148.

In one or more aspects, the block 148 includes turning on one or more components of the meter 104. In some aspects, the block 148 includes turning on the microphone array 126, which is configured to receive audio signals. In some aspects, the block 148 includes conducting beamforming to determine the location of the media device 102 rather than the location of other noises (such as a dog barking, a person singing, a dishwasher running, and the like). In some aspects, the block 148 includes selectively receiving a signal with a desired orientation (based on location of media device 102) to increase audio signals received from the media device. In some instances, the block 148 includes locating the media device 102 and/or the loudspeaker 103 within the media exposure environment 100. In one or more aspects, the block 148 includes using that location to define a desired orientation and/or beamforming beam's DOA. In one or more aspects, the location of the sound source (e.g., the media device 102 and the loudspeaker 103) is determined by receiving audio signals on a plurality of microphones in the microphone array 126 and determining phase information based on the time delays of the received audio signals to determine which direction has the strongest signal indicating a DOA corresponding to a location of the sound source. In some instances, the desired orientation and/or DOA is stored by the meter 104 for later use (such as in the block 150). In several instances, the desired orientation and/or DOA is stored with a timestamp or time indication.

In one or more aspects, the block 150 occurs after the block 148. In some aspects, the microphone array 126 receives audio signals from the media device 102 at the block 150 and the previously determined orientation and/or beamforming beam's DOA from the block 148 is used. In some aspects, one or more microphones of the microphone array 126 receive audio signals from the media device 102. In some aspects, block 150 includes receiving audio signals prior to orienting, and thus block 150 may occur simultaneously to one or more of the blocks 142 through 148. In some aspects, the block 150 is omitted. In some instances, if too much time has lapsed since the stored orientation/or the stored DOA was determined (for example, based on the time indication), the system 110 will determine a new orientation and/or a new beamforming beam's DOA based on the new source of sound. In several aspects, the next time the media device 102 is turned on, then the method 138 repeats and a new orientation and/or a new beamforming beam's DOA will be stored.

In various aspects, the method 138 will repeat when the media device 102 is turned on again at the block 140 and produces a media device ON signal. In some aspects, the method 138 occurs for a plurality of media devices. For example, the method 138 may occur when a television is turned on by the first person 106 in the media exposure environment 100; and then, the method 138 may occur when the second person 108 in the media exposure environment 100 starts a radio. The radio and the television may both have a respective dongle. In some aspects, re-orienting the beamforming beam toward the loudspeaker 103 and/or the media device 102 occurs after a set amount of time if no new media device ON signal has been detected during the set amount of time. In some instances, the set amount of time is a configurable parameter (such as two hours, twelve hours, twenty-four hours, and the like). In some instances, the block 148 is skipped if the block 148 had recently (e.g., five minutes prior) been performed. In some instances, the method 152 includes an additional block for storing the orientation and/or the DOA of the block 164 to be used as a default until a new orientation and/or new DOA is determined. In some instances, a new orientation and/or new DOA is determined when the meter 104 and/or the media device 102 is moved or restarted. In some aspects, the system 110 includes components of the system 128 such as the loudspeaker 103.

Figure 5:
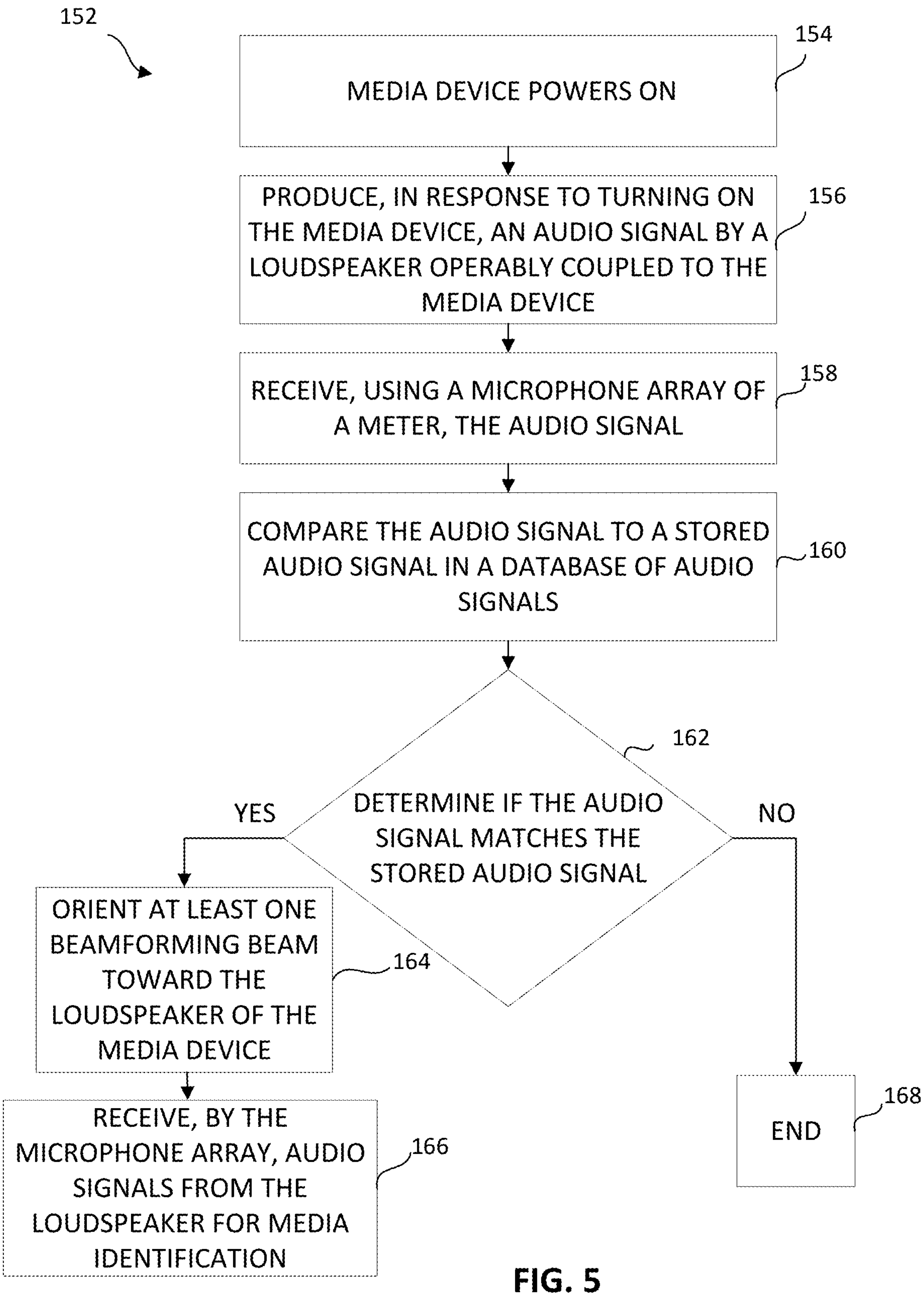
FIG. 5 is a flow chart of an example method for using a start sound of a media device to orient a beamforming beam toward the media device in accordance with one or more aspects.

Referring to FIG. 5, with continuing reference to FIGS. 1 and 3, a method 152 for orienting a beamforming beam toward the media device 102 according to one or more instances is described. Method 152 is illustrated as a set of operations or blocks 154 through 168. Not all of the illustrated blocks 154 through 168 may be performed in all aspects of method 152. One or more blocks that are not expressly illustrated in FIG. 5 may be included before, after, in between, or as part of the blocks 154 through 168. In some aspects, one or more of the blocks 154 through 168 may be implemented, at least in part, by the system 128, in the form of executable code stored on non-transitory, tangible, machine-readable media that when run by one or more processors may cause the one or more processors to perform one or more of the processes. In one or more aspects, the blocks in method 152 are performed within a computing system, within the system 128 in FIG. 3, as described herein.

In an example aspect, the method 152 includes: a media device powering on at a block 154; producing, in response to turning on the media device, an audio signal by a loudspeaker operably coupled to the media device at a block 156; receiving, using a microphone array of a meter, the audio signal at a block 158; comparing the audio signal to a stored audio signal in a database of audio signals at a block 160; determining if the audio signal matches the stored audio signal at a block 162, if there is a match, then proceed to a block 164 for orienting at least one beamforming beam toward the loudspeaker of the media device; and then to a block 166 for receiving, by the microphone array, audio signals from the loudspeaker for media identification; and if there is no match, then proceed to a block 164 for ending the method 152.

In various aspects, the block 154 includes sending power to the media device using a power source such as the power source 112. In some aspects, the media device is the media device 102. In one or more aspects, a panelist such as the first person 106 turns on the media device 102 such that the media device 102 receives power.

In several aspects, the block 156 includes producing the same audio signal each time the media device 102 is turned on. In some aspects, the same audio signal is based on the make and/or model of the media device 102. In several aspects, the same audio signal is an audio sound for a media device company. In one or more aspects, the block 156 includes producing the audio signal such as the audio signal 132 using a loudspeaker such as the loudspeaker 103. In some aspects, the audio signal that is generated is the same for each time the media device 102 is turned on; however, the location of where the sound is produced changes based on the selected sound output of the media device 102 such as using external surround sound loudspeakers versus internal loudspeakers of a media device 102. In some aspects, at the block 156 the loudspeaker 103 is wirelessly coupled to the media device. In other aspects, the loudspeaker 103 at the block 156 is integrated into the media device 102. In yet other examples, the loudspeaker 103 may be connected to the media device 102 via a wired connection such as with a sound bar.

In some aspects, the block 158 receives using the microphone array 126 of the meter 104 the audio signal 132 in response to the block 156. In some aspects, the microphone array 126 is constantly scanning for audio signals. In other aspects, the microphone array 126 is scanning for audio signals at regular intervals. In one or more aspects, the microphone array 126 may be scanning for audio signals because a media ON signal was received as described herein.

In various aspects, the block 160 includes comparing the audio signal 132 to one or more stored audio signals in the audio database 136. In one or more aspects, the audio signal 132 is compared directly to one or more audio signals stored in the audio database 136. In some aspects, the audio signal 132 is compared to one or more audio signals stored in the audio database 136 using watermark decoding to determine a match. In one or more aspects, the audio signal 132 is compared to one or more of the audio signals stored in the audio database 136 using signature generation. In some aspects, the audio database 136 is stored on the meter 104, and the block 160 occurs at the meter 104. In one or more aspects, the block 160 occurs at the comparison module 134 in the meter 104. In other aspects, the audio signal 132 is sent over a network (such as network 120) to a server for the comparison at the block 160. In other aspects, the meter 104 calls information from the audio database 136 when the audio database 136 is remote from the meter 104. In some aspects, the comparison of the block 160 generates a percent match. In one or more aspects, the comparison at the block 160 generates a comparison value which represents the confidence level of a match to be later compared to a stored threshold value to determine if a match is present. The comparison value may be determined by a direct comparison of audio signals, a comparison of signatures, or a comparison based on a decoded watermark. In some aspects, a plurality of audio signals from the audio database 136 is compared to the audio signal 132 at the comparison module 134.

In one or more aspects, the block 162 occurs immediately and in response to the block 160. In several aspects, the block 162 determines if the audio signal 132 matches one of the stored audio signals in the audio database 136. In some aspects, the determination of the block 162 is based on if the comparison value satisfies the pre-stored threshold. For example, if the comparison value is 17 out of 100 and the pre-stored threshold value is 65, then the 17 does not satisfy the threshold value, and the block 162 would determine a no match and proceed to the block 168. In one or more instances, the block 162 determines a match or a no match. In some aspects, the determination of the block 162 is based on a percentage value. For example, if comparing the audio signal 132 to the stored audio signal produced a 75% match, then at the block 162, a match is determined and proceeds to block 164.

In several aspects, a match is determined at the block 162, and proceeds to the block 164 for orienting at least one beamforming beam toward the loudspeaker 103 of the media device 102 using the beamforming scanning module 124. In one or more aspects, the at least one beamforming beam is oriented toward the media device 102.

In one or more aspects, the block 166 occurs after the block 164. In some instances, the microphone array 126 receives audio signals from the loudspeaker 103 of the media device 102 for media identification. In several examples, the microphone array 126 then beamforms the received audio signals based on the location of the media device 102 and/or the loudspeakers 130 of the media device. In one or more aspects, during the method 152, the microphone array 126 is collecting and storing audio signals in a data buffer for processing based on the determination of the block 162. In some instances, the block 166 occurs prior to and/or simultaneously to the block 164. For example, if a match is found, then beamforming is used to orient the stored audio signals toward the loudspeaker 103 of the media device 102. In some instances, the block 164 and the block 166 occur simultaneously and include locating a new source of the sound at the same time as orienting the beam DOA toward the source of the new sound. In some aspects, locating the new source of the sound is determined based on the media device ON sound.

In some aspects, a match is not determined at the block 162, and proceeds to the block 168 to end the method 152. In some instances, the microphone array 126 has been collecting audio signals during the method 152, if no match is found for the initial audio signal with any of the audio signals of the audio database 136, then the later-received audio signals, which may be stored in a data buffer, are deleted.

In various aspects, the method 152 will repeat when the media device 102 is turned on again at the block 154 and produces a new audio signal (the media ON sound). In some aspects, the method 152 occurs for a plurality of media devices. For example, the method 152 may occur when a television is turned on by the first person 106 in the media exposure environment 100; and then, the method 170 may occur when a second person 108 in the media exposure environment 100 starts a sound system coupled to the radio that has a specific start sound. In some aspects, re-orienting the beamforming beam toward the loudspeaker 103 and/or the media device 102 occurs after a set amount of time if no new media ON sound has been detected during the set amount of time. For example, some media devices may not have a start sound or the start sound is silenced via a setting of the media device 102. In some instances, the set amount of time is a configurable parameter (such as two hours, twelve hours, twenty-four hours, and the like). In some instances, the method 152 includes an additional block for storing the orientation and/or beamforming beam's DOA of the block 164 to be used as a default until a new orientation and/or new DOA is determined. In some aspects, the system 128 includes components of the system 110 such that the method 138 is used in conjunction with the method 152.

Figure 6:
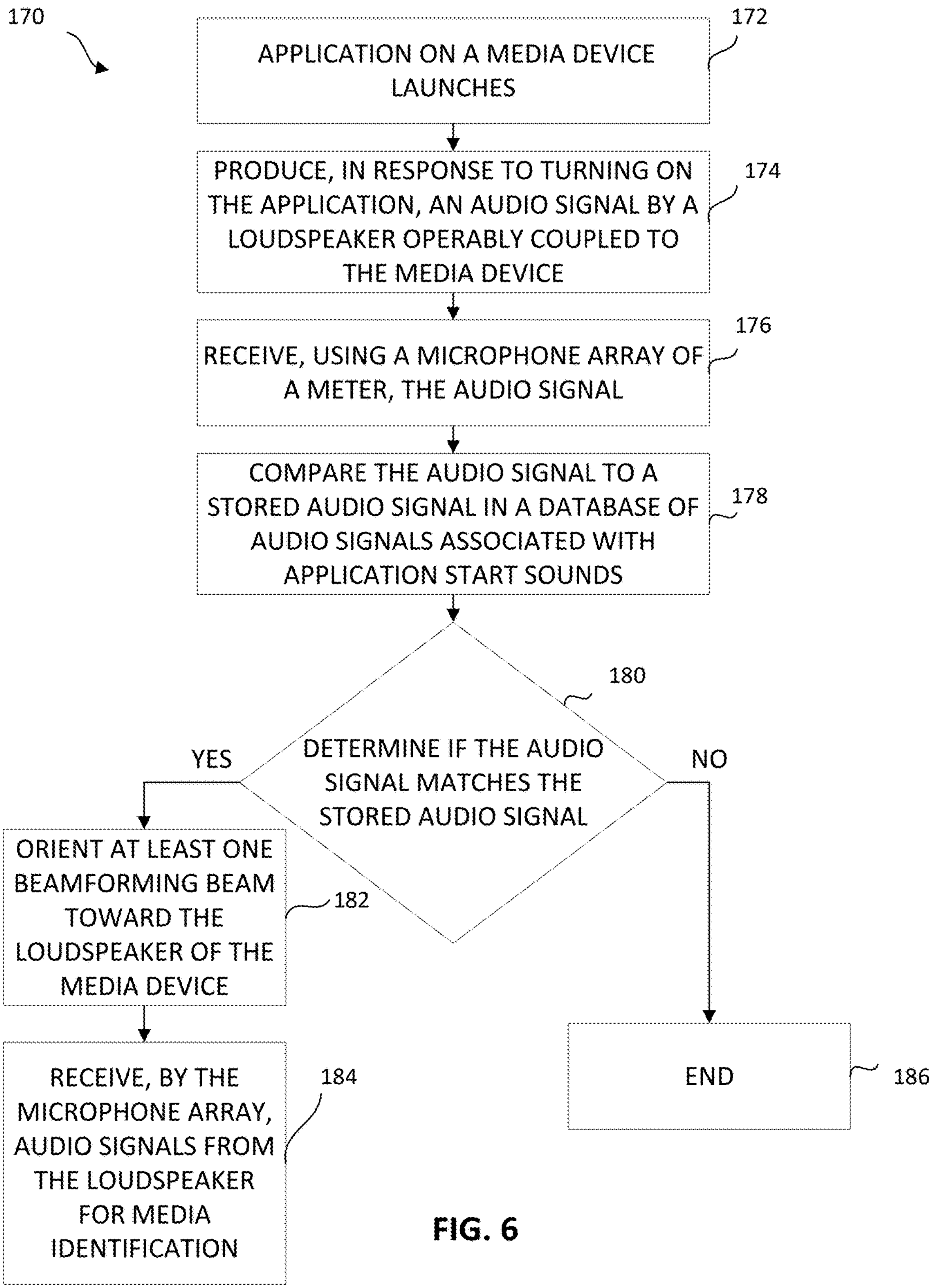
FIG. 6 is another flow chart of an example method for using a start sound of an application on a media device to orient a beamforming beam toward the media device in accordance with one or more aspects.

Referring to FIG. 6, with continuing reference to FIGS. 1 and 3, a method 170 for orienting a beamforming beam toward the media device 102 according to one or more instances is described. Method 170 is illustrated as a set of operations or blocks 172 through 186. Not all of the illustrated blocks 172 through 186 may be performed in all aspects of method 170. One or more blocks that are not expressly illustrated in FIG. 6 may be included before, after, in between, or as part of the blocks 172 through 186. In some aspects, one or more of the blocks 172 through 186 may be implemented, at least in part, by the system 128, in the form of executable code stored on non-transitory, tangible, machine-readable media that when run by one or more processors may cause the one or more processors to perform one or more of the processes. In one or more aspects, the blocks in method 170 are performed within a computing system, within the system 128 in FIG. 3, as described herein.

In an example aspect, the method 170 includes: launching an application on a media device on at a block 172; producing, in response to turning on the application, an audio signal by a loudspeaker operably coupled to the media device at a block 174; receiving, using a microphone array of a meter, the audio signal at a block 176; comparing the audio signal to a stored audio signal in a database of audio signals associated with application start sounds at a block 178; determining if the audio signal matches the stored audio signal at a block 180, if there is a match, then proceed to a block 182 for orienting at least one beamforming beam toward the loudspeaker of the media device; and then to a block 184 for receiving, by the microphone array, audio signals from the loudspeaker for media identification; and if there is no match, then proceed to a block 186 for ending the method 170.

In one or more aspects, the block 172 includes a panelist such as the first person 106 turning on the media device 102 such that the media device 102 receives power and then selects an application (such as a streaming site like Netflix®, Peacock®, and Hulu®) to launch. In In various aspects, the block 172 may include sending power to the media device using a power source such as the power source 112. In some aspects, the media device is the media device 102. In some instances, the application may be for any form of media entertainment such as, but not limited to: TV streaming, music streaming, video streaming, video game streaming, and the like.

In several aspects, the block 174 includes producing the same audio signal each time the particular application on the media device 102 is turned on. In one or more aspects, each application has a respective audio signal. In several aspects, the audio signal is an audio sound for a respective application that indicates the application is loading and/or starting. In some aspects, if turning on the application does not produce an audio signal, then the method 170 ends at the block 172. In one or more aspects, the block 172 includes producing the audio signal such as the audio signal 132 using a loudspeaker such as the loudspeaker 103. In some aspects, the audio signal that is generated is the same for each time the application is turned on using the media device 102; however, the location of where the sound is produced changes based on the selected sound output of the media device 102 such as using external surround sound loudspeakers versus internal loudspeakers of a media device 102. In some aspects, at the block 174, the loudspeaker 103 is wirelessly coupled to the media device 102. In other aspects, the loudspeaker 103 at the block 174 is integrated into the media device 102. In yet other examples, the loudspeaker 103 may be connected to the media device 102 via a wired connection such as with a sound bar.

In some aspects, the block 176 receives using the microphone array 126 of the meter 104 the audio signal 132 in response to the block 156. In some aspects, the microphone array 126 is constantly scanning for audio signals at regular intervals. In one or more aspects, the microphone array 126 may be scanning for audio signals because a media ON signal was received as described herein. In some aspects, the microphone array 126 may be scanning for audio signals because a media device ON sound was received as described herein.

In various aspects, the block 178 includes comparing the audio signal 132 to one or more stored audio signals in the audio database 136. The audio signals in the audio database 136, in some instances, are a set of stored application start audio signals and/or audio data associated with application start sounds. In some aspects, the audio database 136 is stored on the meter 104, and the block 160 occurs at the meter 104. In one or more aspects, the block 160 occurs at the comparison module 134 in the meter 104. In other aspects, the audio signal 132 is sent over a network (such as network 120) to a server for the comparison at the block 178. In other aspects, the meter 104 calls information from the audio database 136 when the audio database 136 is remote from the meter 104. In some aspects, the comparison of the block 178 generates a percent match. In one or more aspects, the comparison at the block 178 generates a comparison value which represents the confidence level of a match to be later compared to a stored threshold value to determine if a match is present. In some aspects, a plurality of audio signals from the audio database 136 is compared to the audio signal 132 at the comparison module 134.

In one or more aspects, the block 180 occurs immediately and in response to the block 178. In several aspects, the block 180 determines if the audio signal 132 matches one of the stored audio signals in the audio database 136. In some aspects, the determination of the block 180 is based on if the comparison value satisfies the pre-stored threshold. For example, if the comparison value is 66 out of 100 and the pre-stored threshold value is 65, then the 66 does satisfy the threshold value, and the block 180 would determine a match, and the method 170 proceeds to the block 182. In one or more instances, the block 180 determines a match or a no match. In some aspects, the determination of the block 180 is based on a percentage value. For example, if comparing the audio signal 132 to the stored audio signal produced a 25% match, then at the block 180, a no match is determined, and the method 170 proceeds to the block 186. In some aspects, the block 180 compares the audio signal 132 to only one stored audio signal. In other aspects, the block 180 compares the audio signal 132 to a plurality of stored audio signals to determine a match. In some instances, the comparison of the audio signal 132 with respective audio signals of the audio database 136 having the greatest match is then used in the block 182.

In several aspects, a match is determined at the block 180, and proceeds to the block 182 for orienting at least one beamforming beam toward the loudspeaker 103 of the media device 102 using the beamforming scanning module 124. In one or more aspects, the at least one beamforming beam is oriented toward the media device 102.

In one or more aspects, the block 184 occurs after the block 182. In some instances, the microphone array 126 receives audio signals from the loudspeaker 103 of the media device 102 for media identification. In several examples, the microphone array 126 then beamforms the received audio signals based on the location of the media device 102 and/or the loudspeakers 130 of the media device 102. In one or more aspects, during the method 170, the microphone array 126 is collecting and storing audio signals in a data buffer for processing based on the determination of the block 180. In some instances, the block 184 occurs prior to and/or simultaneously to the block 182. For example, if a match is found, then beamforming is used to orient the stored audio signals toward the loudspeaker 103 of the media device 102. In some instances, the block 182 and the block 184 occur simultaneously and include locating a new source of the sound at the same time as orienting the beam DOA toward the source of the new sound. In some aspects, locating the new source of the sound is determined based on the start ON sound of the application of the media device 102. In some aspects, the new source of the sound is the media device 102 and/or the loudspeaker 103.

In some aspects, a match is not determined at the block 180, and proceeds to the block 186 to end the method 152. In some instances, rather than proceeding to the block 186, an additional block is used to determine if any other audio signals from the audio database 136 should be compared to the audio signal 132, if so, then after the additional block, the method 170 proceeds to the block 178 to compare the audio signal 132 with the next audio signal from the audio database 136, and if not, then the method 170 proceeds to the block 186. In some instances, the microphone array 126 has been collecting audio signals during the method 170, if no match is found for the initial audio signal with any of the audio signals of the audio database 136, then the later-received audio signals, which may be stored in a data buffer, are deleted.

In some aspects, the method 170 repeats when a new application is turned on in the media exposure environment 100. In some aspects, the method 170 occurs for a plurality of media devices. For example, the method 170 may occur when a first application is launched on a television by the first person 106 in the media exposure environment 100; and then, the method 170 may occur when the second person 108 in the media exposure environment 100 launches a second application on her mobile device. In some aspects, re-orienting the beamforming beam toward the loudspeaker 103 and/or the media device 102 occurs after a set amount of time if no new application start sound has been detected during the set amount of time. In some instances, the time is configurable parameter (such as two hours, twelve hours, twenty-four hours, and the like). In some instances, the method 170 includes an additional block for storing the orientation and/or beamforming beam's DOA of the block 182 to be used as a default until a new orientation and/or DOA is determined. In some aspects, the system 128 includes components of the system 110 such that the method 138 is used in conjunction with the method 170. For example, when the meter 104 determines that the media device 102 is turned on based on receiving the data packets, the meter 104 may begin to turn on the microphone array 126 in order to detect application start sounds at the block 176 and the beamforming scanning module 124 to orient at least one beamforming beam toward the loudspeaker of the media device at the block 182.

With continuing reference to FIGS. 4-6, in some aspects, an additional block is included for the methods 138, 152, and/or 170 for media identification of the audio signals received at the block 184.

In several instances, the additional block includes watermark decoding. In some aspects, watermark decoding is done after the blocks 150, 166, and/or 184. In some instances, this additional block decodes the watermark embedded in the audio information captured by the microphone array 126. In one or more aspects, a server identifies the media using the watermark.

In several aspects, the additional block includes signature generation. In one or more aspects, the meter 104 extracts audio information associated with a program currently being broadcast and/or viewed by the media device 102 and processes that extracted information to generate audio signatures. In several aspects, the processing of the extracted information to generate audio signatures occurs in the meter 104. The audio signatures may include digital sequences or codes, (such as, but not limited to, StreamFP™), that, at a given instant of time, are substantially unique to each portion of audio content or program. In several examples, the audio information detected by the microphone array 126 are audio snippets with durations of six seconds or shorter. In other instances, the audio information may be 6, 8, or 10 second audio clips or the like. In some aspects, the signature and/or the watermark decoding is sent to a server in order to match to a reference. In this manner, an unidentified video or audio program (such as a radio program) can be reliably identified by finding a matching signature within a database or library containing the signatures of known available programs. When a matching signature is found, the previously unidentified audio content (e.g., television program, advertisement, etc.) is identified as the one of the known available programs corresponding to the matching database signature. In some aspects, signature matching occurs at the meter 104. In other instances, signature matching occurs using a server. In various instances, the additional block includes identifying a previously unidentified video or audio program (such as a radio program) by finding a matching signature within a database or library containing the signatures of known available programs. When a matching signature is found, the previously unidentified audio content (e.g., television program, advertisement, etc.) is identified as the one of the known available programs corresponding to the matching database signature. In some instances, once the media is identified, the information is output as part of media ratings used by an audience measurement entity. In one or more aspects, the additional block occurs in part within the meter 104.

IV. Example Computing Device

Any one or more of the above-described components, such as the meter 104, can take the form of a computing device, or the system 110 and/or the system 128 can take the form of a computing system that includes one or more computing devices.

Figure 7:
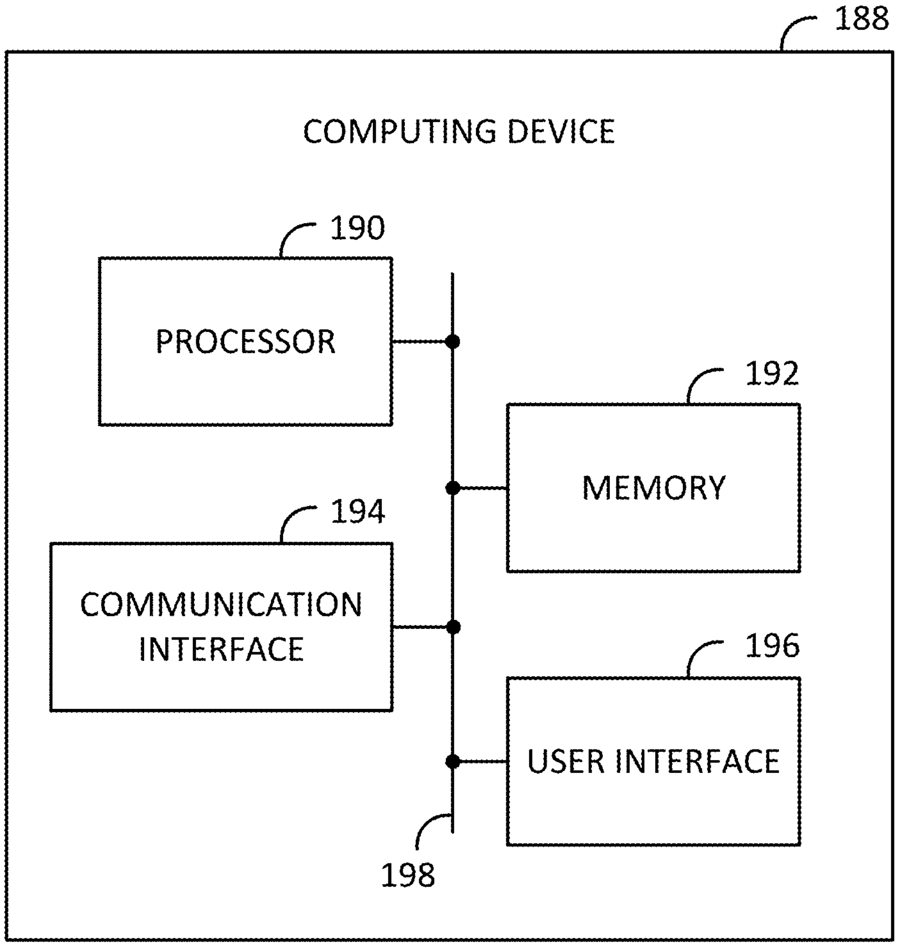
FIG. 7 is an illustrative node for implementing one or more example aspects of the present disclosure, according to an example aspect.

FIG. 7 is a simplified block diagram of an example computing device 188. The computing device 188 can be configured to perform one or more operations, such as the operations described in this disclosure. As shown, the computing device 188 can include various components, such as a processor 190, memory 192, a communication interface 194, and/or a user interface 196. These components can be connected to each other (or to another device, system, or other entity) via a connection mechanism 198.

The processor 190 can include one or more general-purpose processors and/or one or more special-purpose processors.

Memory 192 can include one or more volatile, non-volatile, removable, and/or non-removable storage components, such as magnetic, optical, or flash storage, and/or can be integrated in whole or in part with the processor 190. Further, memory 192 can take the form of a non-transitory computer-readable storage medium, having stored thereon computer-readable program instructions (e.g., compiled or non-compiled program logic and/or machine code) that, upon execution by the processor 190, cause the computing device 188 to perform one or more operations, such as those described in this disclosure. The program instructions can define and/or be part of a discrete software application. In some examples, the computing device 188 can execute the program instructions in response to receiving an input (e.g., via the communication interface 194 and/or the user interface 196). Memory 192 can also store other types of data, such as those types described in this disclosure. In some examples, memory 192 can be implemented using a single physical device, while in other examples, memory 192 can be implemented using two or more physical devices.

The communication interface 194 can include one or more wired interfaces (e.g., an Ethernet interface) or one or more wireless interfaces (e.g., a cellular interface, Wi-Fi interface, or Bluetooth® interface). Such interfaces allow the computing device 188 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 196 can facilitate interaction between computing device 188 and a user of computing device 188, if applicable. As such, the user interface 196 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 196 can include hardware and/or software components that facilitate interaction between the computing device 188 and the user of the computing device 188.

The connection mechanism 198 can be a cable, system bus, computer network connection, or other form of a wired or wireless connection between components of the computing device 188.

One or more of the components of the computing device 188 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 188 can be combined into a single component, and the function described herein for a single component can be subdivided among multiple components.

V. Example Variations

Although the examples and features described above have been described in connection with specific entities and specific operations, in some scenarios, there can be many instances of these entities and many instances of these operations being performed, perhaps contemporaneously or simultaneously, on a large-scale basis.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:

receiving, via a receiver in a meter, a wireless data packet, wherein the wireless data packet is associated with a media device ON signal of a media device; and orienting, based on receipt of the wireless data packet, a beamforming beam of the meter toward the media device.

2. The method of claim 1, wherein orienting the beamforming beam toward the media device comprises:

receiving, using a microphone array of the meter, an audio signal;

determining a direction of arrival of the audio signal, wherein the direction of arrival corresponds to a location of a source of the audio signal, and wherein the source of the audio signal is the media device; and beamforming based on the direction of arrival.

3. The method of claim 1, further comprising:

calculating, using the receiver, a direction corresponding to a location where the wireless data packet was transmitted from; and estimating, using the calculated direction, a direction of arrival; and wherein orienting the beamforming beam toward the media device comprises using the estimated direction of arrival to orient the beamforming beam toward the media device.

4. The method of claim 1, further comprising:

wherein the media device ON signal is generated when the media device powers ON.

5. The method of claim 4, further comprising:

receiving, via a dongle coupled to the media device, a media device ON signal; and transmitting, using a transmitter in the dongle, the wireless data packet over a network.

6. The method of claim 1, further comprising:

receiving, after orienting, audio signals from the media device for media identification, wherein a microphone array of the meter receives the audio signals.

7. The method of claim 6, further comprising:

identifying media content from the received audio signals.

8. A non-transitory computer-readable storage medium, having stored thereon program instructions that, upon execution by a processor, cause performance of a set of operations comprising:

receiving, via a receiver in a meter, a wireless data packet, wherein the wireless data packet is associated with a media device ON signal of a media device; and orienting, based on receipt of the wireless data packet, a beamforming beam of the meter toward the media device.

9. The non-transitory computer-readable storage medium of claim 8, wherein orienting the beamforming beam toward the media device comprises:

determining a direction of arrival of an audio signal, wherein the direction of arrival corresponds to a location of a source of the audio signal, and wherein the source of the audio signal is the media device; and beamforming based on the direction of arrival.

10. The non-transitory computer-readable storage medium of claim 8, the set of operations further comprising:

calculating, using the receiver, a direction corresponding to a location where the wireless data packet was transmitted from; and estimating, using the calculated direction, a direction of arrival; and wherein orienting the beamforming beam toward the media device comprises using the estimated direction of arrival to orient the beamforming beam toward the media device.

11. The non-transitory computer-readable storage medium of claim 8, the set of operations further comprising:

receiving, after orienting, audio signals from the media device for media identification, wherein a microphone array of the meter receives the audio signals; and identifying media content from the received audio signals.

12. The non-transitory computer-readable storage medium of claim 8, wherein the media device ON signal is generated when the media device powers ON.

13. The non-transitory computer-readable storage medium of claim 12, the set of operations further comprising:

receiving, via a dongle coupled to the media device, a media device ON signal; and transmitting, using a transmitter in the dongle, the wireless data packet over a network.

14. A computing system comprising:

a processor; and a non-transitory computer-readable storage medium, having stored thereon program instructions that, upon execution by the processor, cause performance of a set of operations comprising:

receiving, via a receiver in a meter, a wireless data packet, wherein the wireless data packet is associated with a media device ON signal of a media device; and orienting, based on receipt of the wireless data packet, a beamforming beam of the meter toward the media device.

15. The computing system of claim 14, wherein orienting the beamforming beam toward the media device comprises:

determining a direction of arrival of an audio signal, wherein the direction of arrival corresponds to a location of a source of the audio signal, and wherein the source of the audio signal is the media device; and beamforming based on the direction of arrival.

16. The computing system of claim 14, the set of operations further comprising:

calculating, using the receiver, a direction corresponding to a location where the wireless data packet was transmitted from; and estimating, using the calculated direction, a direction of arrival; and wherein orienting the beamforming beam toward the media device comprises using the estimated direction of arrival to orient the beamforming beam toward the media device.

17. The computing system of claim 14, the set of operations further comprising:

wherein the media device ON signal is generated when the media device powers ON.

18. The computing system of claim 17, the set of operations further comprising:

receiving, via a dongle coupled to the media device, a media device ON signal; and transmitting, using a transmitter in the dongle, the wireless data packet over a network.

19. The computing system of claim 14, the set of operations further comprising:

receiving, after orienting, audio signals from the media device for media identification, wherein a microphone array of the meter receives the audio signals.

20. The computing system of claim 19, the set of operations further comprising:

identifying media content from the received audio signals.

* * * * *